United States Patent [19]

Iyotani et al.

[11] 4,100,434
[45] Jul. 11, 1978

[54] GATE CONTROLLING APPARATUS FOR A THYRISTOR VALVE

[75] Inventors: Ryuji Iyotani; Atsumi Watanabe; Hisao Amano; Fumio Ogata, all of Hitachi, Japan

[73] Assignee: Hitachi, Ltd., Japan

[21] Appl. No.: 669,751

[22] Filed: Mar. 24, 1976

[30] Foreign Application Priority Data

Apr. 7, 1975 [JP] Japan .................................. 50-41305

[51] Int. Cl.² ........................................... H03K 17/14
[52] U.S. Cl. ................................ 307/252 L; 307/310; 363/68
[58] Field of Search ........... 307/252 L, 252 N, 252 Q, 307/252 UA, 310; 321/18, 27 R

[56] References Cited

U.S. PATENT DOCUMENTS

3,728,557 4/1973 Pelly et al. .................... 307/252 UA

Primary Examiner—John Zazworsky
Assistant Examiner—Marcus S. Rasco
Attorney, Agent, or Firm—Craig & Antonelli

[57] ABSTRACT

A gate controlling apparatus for a thyristor valve including a plurality of series connected thyristors controlled by a narrow gate pulse. The apparatus includes means for judging whether the thyristor valve is to be in the conductive state or not, means for detecting a forward voltage across at least one of the thyristors in the thyristor valve, and an AND circuit for generating an output at a time when an AND condition between the respective outputs of the judging means and the forward voltage detector means is satisfied. The apparatus further includes means for detecting a period of inverse voltage across at least one of the thyristors in the thyristor valve. The forward and inverse voltages may be, respectively, detected by detecting the forward and inverse voltages of specified thyristors.

12 Claims, 9 Drawing Figures

GATE CONTROLLING APPARATUS FOR A THYRISTOR VALVE

The present invention relates to a gate controlling apparatus for a thyristor valve in which a plurality of thyristors are series and/or parallel-connected, and more particularly to a gate controlling apparatus for thyristors controlled by a narrow gate pulse.

A thyristor valve in which a plurality of thyristors are series and/or parallel-connected has conventionally been used, and a so-called wide gate pulse system is widely used as a gate controlling means for each thyristor in the thyristor valve. The wide gate pulse system is a system in which the thyristor valve receives a gate signal having a duration or width of 120°, measured at an electrical angle, corresponding to a period during which conduction should occur to the thyristor valve which constitutes one area of a three-phase full-wave bridge circuit, for example. In this system, stable operation of the thyristor valve can be achieved under normal conditions because the gate signal is continuously applied to each thyristor during the conductive period. Further, for a thyristor valve operated as an inverter, the gate signal is applied to each thyristor, as disclosed in U.S Pat. No. 3,881,147 to render each thyristor conductive when the period of inverse voltage applied to the thyristor valve is under a predetermined time in order to avoid abnormality in the operation thereof due to irregularities in the inverse restoration characteristics of each thyristor.

The wide gate pulse system, however, has a drawback in that a great amount of power consumption of the supplied electric power occurs because the gate signal must be generated without interruption over a long period of time. The gate controlling circuit is also disadvantageously complicated and large in size if it is intended that the gate signal is transmitted to thyristors positioned at a high voltage section of the thyristor valve.

For this reason, a gate controlling apparatus using a narrow gate pulse system has been proposed, for example by Japanese Laid-Open Patent Application KOKAI No. 58,743,/74 which corresponds to U.S. Pat. No. 3,878,448, in which a signal required to fire each thyristor is applied only at the beginning of the conduction period. In the narrow gate pulse system, however, if an inverse voltage of short duration is applied to the thyristor valve for some reason during the conduction period and if the period of the applied inverse voltage is longer than the time required to turn all the thyristors off, the current merely ceases to flow during the conduction period but no harm is done to the thyristor valve. If, on the other hand, the applied period of the inverse voltage is shorter than the turn-off time of any specified one or more but less than all of the thyristors constituting the thyristor valve, the other thyristor or thyristors which have a smaller turnoff time than the period of the applied inverse voltage will be turned off and remain in an OFF state when a forward voltage is again applied, to the valve, but the above-mentioned specified thyristor or thyristors cannot turn off, thus still remaining in an ON state when the forward voltage is then applied. For this reason, only the turned-off thyristor or thyristors receive a voltage in the series connection of thyristors, and one thyristor eventually receives the total applied voltage with the result of the risk of damage of the thyristor. In the parallel connection of thyristors, on the other hand, a current flows concentratedly only to a thyristor which is not turned off and remains in the ON state with the risk of damage of the thyristor which could not be turned off.

An object of the present invention is to provide a gate controlling apparatus for a thyristor valve capable of effecting a stable operation of the thyristor valve having thyristors series and/or parallel-connected and controlling the thyristors with the aid of a narrow gate pulse.

Another object of the present invention is to provide a gate controlling apparatus for a thyristor valve adapted to provide an easy detection of whether a forward voltage is applied to all the thyristors constituting the thyristor valve.

Still another object of the present invention is to provide a gate controlling apparatus for a thyristor valve capable of providing an easy detection of whether the period of an inverse voltage applied to all the thyristors is above a predetermined value.

According to the present invention there is provided a gate controlling apparatus for a thyristor valve which has a plurality of thyristors which are for example series connected. The apparatus comprises a judging circuit for judging whether the gate pulse is to be applied to the thyristors in the thyristor valve, a forward voltage detector circuit for detecting a forward voltage across at least one of the thyristors of the thyristor valve which is the last or among the last to receive the forward voltage after an inverse voltage has been applied to the valve, an AND circuit for generating an output only when the AND condition between the respective outputs of the judging circuit and the forward voltage detector circuit is satisfied, and a pulse amplifier for providing a narrow gate signal to each thyristor in the thyristor valve in response to an output from the AND circuit. According to the present invention, with proper selection of the thyristor connected to the forward voltage detector partial firing of the thyristors can be prevented because a firing pulse is applied to each thyristor only at a time when a forward voltage is applied to every thyristor. The apparatus according to the present invention further comprises an inverse voltage detector circuit for detecting a period of inverse voltage acrosss at least one of the thyristors which is the last or among the last to receive the inverse voltage and a timer so that partial conduction of the thyristors may be prevented because the firing pulse is only when a forward voltage is applied to every thyristor. Further, no thyristor can be turned off during the conduction period because the firing pulse will be generated so long as a forward voltage is applied to every thyristor should a thyristor attempt to turn off. Furthermore, each of the forward and inverse voltages across the respective thyristors can be detected with ease because they are detected across specified ones of the thyristors which are indicative of the other thyristors. This allows the presentation of a gate controlling apparatus for a thyristor valve capable of controlling the thyristor valve in a stable manner.

In the following, the present invention will be described with reference to various embodiments in conjunction with the drawings.

Figure 1:
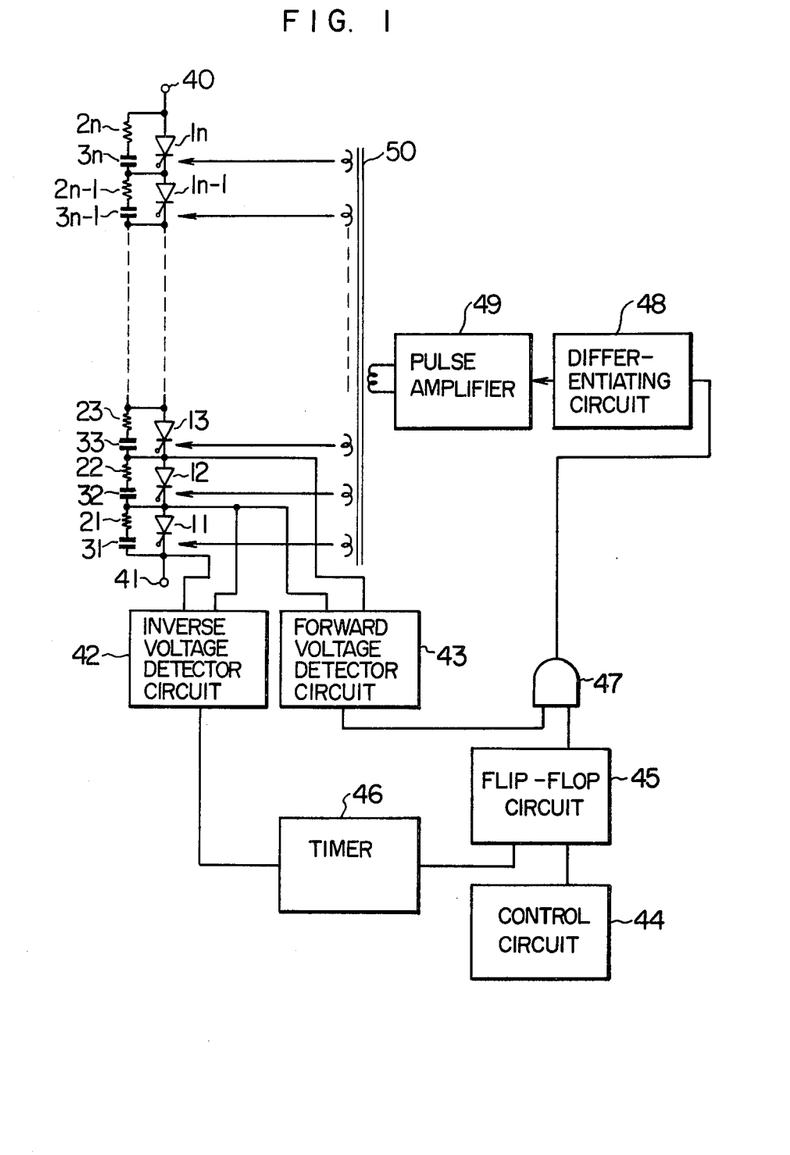
FIG. 1 is a circuit diagram of an embodiment of the gate controlling apparatus thyristor valve according to the present invention.

FIG. 1 is a circuit diagram of a gate controlling apparatus for a series connected thyristor valve, showing one embodiment according to the present invention.

In the drawing, 11 to 1n designate thyristors, 40 and 41 terminals of the thyristor valve, and 21 to 2n and 31 to 3n resistors and capacitors for equalizing a divided voltage across each thyristor. It is known that when an inverse voltage is applied across a series connection of a plurality of thyristors, the respective periods during which the inverse voltage appears across the individual thyristors differ from one another in accordance with the respective values of the storage charge Qr thereof. An inverse voltage appears earlier across a thyristor having a smaller storage charge than a thyristor having a larger storage charge. In other words, the period during which an inverse voltage appears across a thyristor having a smaller storage charge is longer than that of a thyristor having a larger storage charge. It is therefore assumed for purposes of this description that the thyristor 11 among the thyristors 11 to 1n because of its characteristics holds the highest valve of storage charge as compared to the other thyristors (Qr) and that the thyristor 12 a minimum one holds the lowest value, under equal temperature conditions. An inverse voltage detector circuit 42 and a forward voltage detector circuit 43 which are connected across the thyristors 11 and 12, respectively, generate their outputs at times during which the associated thyristor receives an inverse voltage and a forward voltage, respectively. A control circuit 44 provides a firing pulse at a time when the thyristor valve is required to be fired. A flip-flop circuit 45 is set by the firing pulse transmitted thereto from the control circuit 44 and is reset by an output from a timer 46 described hereinafter. The timer 46 for example IC MC 675 produced by Motorola, Inc., generates an output to reset the flip-flop 45 when the duration of the output from the inverse voltage detector 42 is larger than a predetermined time $T_o$. An AND circuit 47 provides an output when the forward voltage detector 43 and the flip-flop 45 generate their outputs simultaneously. A differentiating circuit 48 generates a pulse at the rising portion of the output from the AND circuit 47. A pulse amplifier 49 serves to amplify the pulse generated by the differentiating circuit 48 and applies a gate pulse to all the thyristors through a pulse transformer 50.

Referring next to the waveforms shown in FIG. 2, the operation of the embodiment in FIG. 1 will be described.

The flip-flop 45 is set when the firing pulse is transferred from the control circuit 44. At this time, the thyristors 11 to 1n each have a forward voltage drop thereacross, so that the AND condition of the respective outputs from the flip-flop 45 and the forward voltage detector 43 is immediately satisfied with the result that the AND circuit 47 generates an output to provide the gate signal to fire all the thyristors in the thyristor valve. As soon as the thyristors 11 to 1n become conductive, the forward voltage drop across the thyristors disappears and thus the output from the forward voltage detector 43 disappears. However, the flip-flop 45 remains set to provide an output to one input of gate 47. Thus, if any thyristor should attempt to turn off during the normal conduction period, a forward voltage would appear again across thyristor 12 to produce an output once again from forward voltage detector circuit 43. This would enable gate 47 to initiate generation of a firing pulse to the thyristors even though no control pulse is generated by control circuit 44.

When the conductive duration of that phase of the three-phase A.C. voltage source applied to the thyristor valve ends, an inverse voltage will be applied to the thyristor valve to turn off each thyristor thereof. As will be described in more detail hereinafter in conjunction with FIG. 4, another thyristor valve will then receive a forward voltage and be turned on at the proper time. Such is the standard operation of a three-phase system.

However, it may be possible that an inverse voltage may be applied briefly to the thyristor valve during the normal conduction period. For the thyristor valve which receives an inverse voltage after having a forward voltage applied thereto, the inverse voltage will appear across each component thyristor thereof at a time depending on the individual storage charge of that thyristor.

Figure 2:
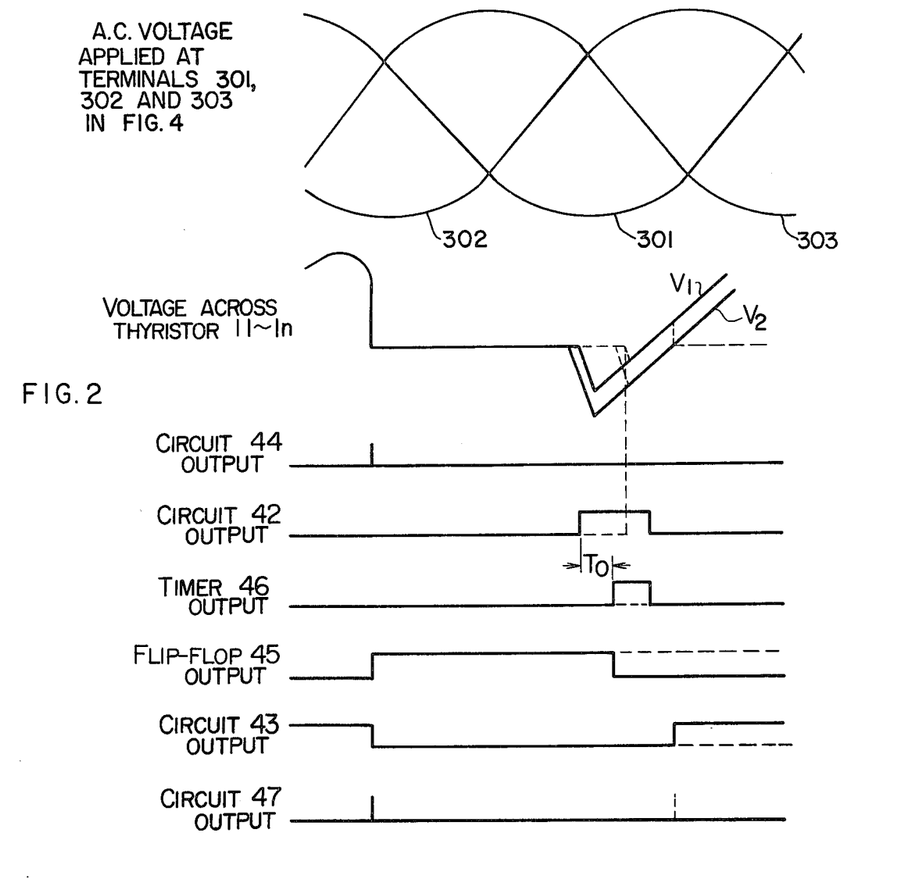
FIG. 2 shows operational waveforms generated from the circuit shown in FIG. 1.

In FIG. 2, V1 denotes a voltage across the thyristor 11 which takes the highest value of storage carrier and V2 voltage across the thyristor 12 which takes a the lowest value, in the described example. The voltage across the other thyristors 13 to 1n ranges anywhere between the voltages V1 and V2. Normally, as illustrated by solid lines in FIG, 2, even the period during which an inverse voltage appears across the thyristor 11 is long enough to exceed a predetermined time To. Since this period of inverse voltage appearing across the thyristor 11 is shorter than that of each of the remaining thyristors 12 to 1n, the remaining thyristors 12 to 1n have been turned off before the termination of the period of inverse voltage appearing across the thyristor 11 so that the forward voltage which is applied to the thyristor valve after the termination of the period of the inverse voltage appearing across the thyristor 11 may be shared among the respective thyristors 11 to 1n equally.

In this case, the flip-flop 45 is reset after the lapse of time To from the rising of the output of the inverse voltage detector 42. The output from the timer 46, on the other hand, does not appear when the inverse voltage is so small that the voltages V1 and V2 vary as shown by the dotted line in FIG. 2 and the duration of the output from the inverse voltage detector 42 is shorter than the time $T_o$. Thus, the flip-flop 45 is not reset under such conditions, so that the AND circuit 47 generates its output to supply all the thyristors with the gate signal to render the thyristor valve conductive again at a time when the voltage V2 increases to the forward voltage.

The timing $T_o$ of the timer 46 is selected to be slightly greater than the maximum value among the respective turning-off durations of the thyristors 11 to 1n. Such a drawback that the gate pulse is applied to the thyristor valve immediately after the turning-off of only some of the thyristors 11 to 1n so that any surplus voltage may be applied to the turned-off thyristors can be eliminated in such a system as described above in which the gate pulse is again generated at the time when the duration of the output from the inverse voltage detector 42 is shorter than the time $T_o$ of the timer 46 which has been selected in such a manner as mentioned above, in view of the fact that the duration of the inverse voltage applied to the thyristor 11 is the minimum value among those of the remaining thyristors. This will be understood with ease based on the fact that all the thyristors 11 to 1n are turned on again when the duration of the output from the inverse voltage detector 42 is shorter than the time To while they are turned off when the duration of the output from the inverse voltage detector 42 is longer than the timer $T_o$ because the respective durations of the inverse voltage applied to the thyristors 12 to 1n other than the thyristor 11 are longer than the time To which is, on the other hand, longer than the maximum value of the respective turn-off durations. According to the present embodiment, the gate pulse is generated when the voltage V2 across the thyristor 12 reaches the forward voltage. At this time, the respective voltages across the thyristors 11, and 13 to 1n other than the thyristor 12 assume the forward value because they are larger than the voltage V2 across the thyristor 12. This assures the firing of all the thyristors 11 to 1n. It is to be noted that, at the above-mentioned time of firing, the thyristor 11 having the maximum residual storage carrier is supplied with a forward voltage as shown in FIG. 2, the value of which is, however, so small as to be negligible in view of irregularities of the storage charge in the thyristors 11 to 1n in comparison with the forward withstand voltage of the thyristors.

In such an arrangement, it is possible to provide the control of the thyristors valve by the narrow gate pulse without any risk of damaging the thyristors irrespective of the differing characteristics of the thyristors. A gate controlling device with low cost and high reliability may, therefore, be provided because it does not require such a large power as in the wide gate pulse system and is formed of simplified circuits.

It is to be noted that, in the embodiment of FIG. 1, the inverse voltage detector 42 is provided in association with the thyristor having the maximum value of storage charge and the forward voltage detector 43 is provided in association with the thyristor having the minimum value. However, these detectors 42 and 43 may be respectively provided with at least one of the thyristors of comparatively large and small values of storage charge, without being necessarily limited to the respective thyristors of the maximum and minimum values of storage charge, when the differing characteristics of the thyristor is not so great.

According to the present invention, basically, it will be easily understood that the forward and inverse voltage detector circuits as required may be provided for each of the thyristors. But, the thus arranged apparatus would involve a high cost.

The storage charge of each thyristor depends on the temperature. Accordingly, in the design of the thyristor valve sufficient attention must be paid to the arrangement of the respective thyristors to which the forward and inverse voltage detectors are connected.

Figure 3:
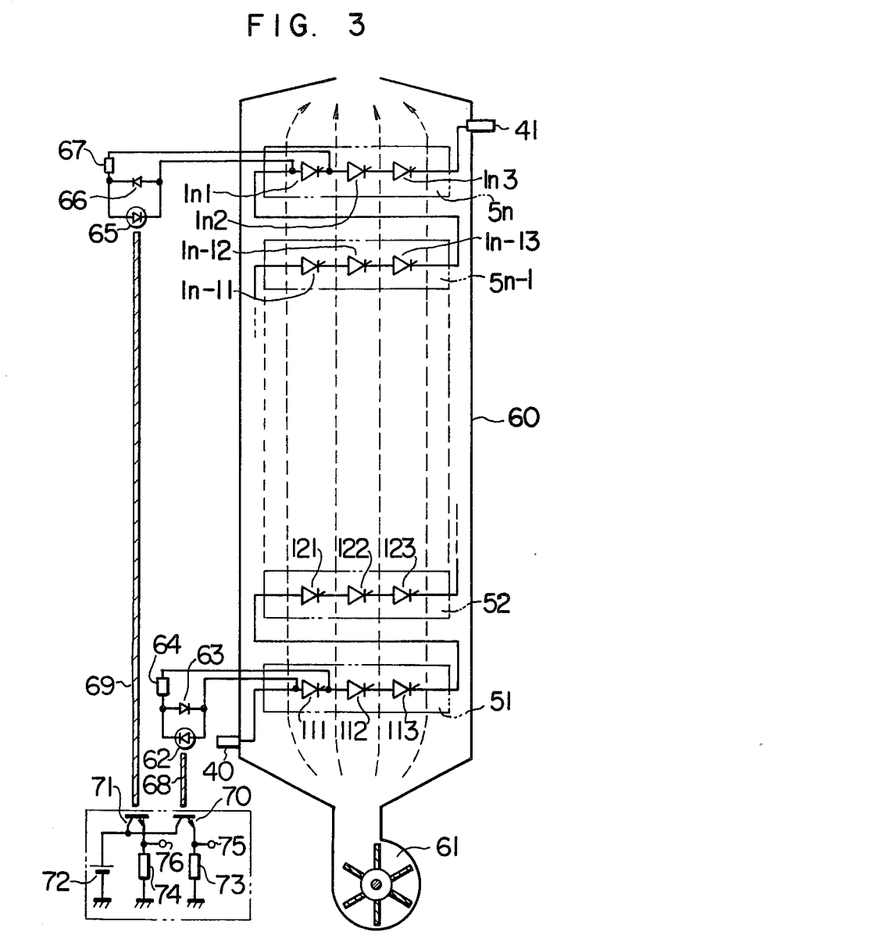
FIG. 3 shows a schematic arrangement of the thyristor valve shown in FIG. 1.

FIG. 3 shows an arrangement of the thyristor valve by way of example. In the drawing, there are disposed series-connected plural thyristors 111 to 1n3 which are mounted in groups or trays 51 to 5n respectively. Three thyristors are arranged in each tray in FIG. 3, but this number of thyristor in one tray is not restricted to three. The trays 51 to 5n are arranged in a stacked manner. The thyristor valve is covered with a cover 60 and has a fan 61 disposed at its lower portion. The fan 61 supplies the thyristors 111 to 1n3 with a cooling medium such as wind or oil for cooling the thyristors. The cover 60 is provided with thyristor valve terminals 40 and 41.

The cooling medium flows in the thyristor valve as shown by the dotted line in FIG. 3 with the aid of the fan 61 and the temperature in the thyristor valve becomes lower at the vicinity of the thyristors nearer to the fan 61 and higher at the vicinity of those farther away from the fan because of warmed cooling medium. The storage charge of a thyristor is dependent on the temperature and tends to increase as the temperature becomes higher. For this reason, for example, the thyristor having a large storage charge may be one disposed near the fan 61 and the thyristor having a small storage charge may be one disposed away therefrom. With such an arrangement the respective absolute valves of storage charge of the thyristors are inverted such that the smaller storage charge of one thyristor becomes larger and vice versa. From the above description it is understood that it is impossible to detect the forward voltage from the thyristor having a small storage charge and the inverse voltage from the thyristor with a large storage charge. In this respect, the thyristor 111 with a small storage charge, which serves as an element from which a forward voltage is detected, is disposed at a position showing a low temperature and the thyristor 1n1 with a large storage charge which serves as an element from which an inverse voltage is detected is disposed at a position showing a high temperature, as shown in FIG. 3.

A voltage between the anode and cathode of the thyristor 111 is detected to actuate a light-emitting diode 62 when a forward voltage is applied to the thyristor 111. A diode 63 serves to prevent an inverse voltage from being applied to the light-emitting diode, and a resistor 64 restricts the current flowing through the light-emitting diode. A light-emitting diode 65 is connected between the anode and cathode of the thyristor 1n1 having a large storage charge such that it emits light when the thyristor 1n1 receives an inverse voltage. A diode 66 prevents a forward voltage from being applied to the light-emitting diode 65 and a resistor 67 restricts the current flowing through the light-emitting diode 65. The light emitted from the light-emitting diodes 62 and 65 is transmitted to phototransistors 70 and 71 through light guides 68 and 69 respectively. These phototransistors 70 and 71 are connected to a power supply and resistors 73 and 74 respectively, and the transmission of light to the phototransistors 70 and 71 can be detected at one of terminals 75 and 76 provided at the ends of the respective resistors 73 and 74. The phototransistor 70 is made conductive and a current flows through the resistor 73 to generate a voltage at the terminal 75 when the thyristor 111 receives a forward voltage and the light-emitting diode 62 emits light. Similarly, a voltage is generated at the terminal 76 when an inverse voltage is applied to the thyristor 1n1. This assures that the storage charge on the thyristor 111 is smaller than that of any other thyristor and the storage charge on the thyristor 1n3 is larger than that of any other thyristor even if the current flows through the thyristors 111 to 1n3 with the result of elevated temperature. This, therefore, allows the satisfied operation of the gate controlling device and the prevention of the thyristor valve from the destruction.

Figure 4:
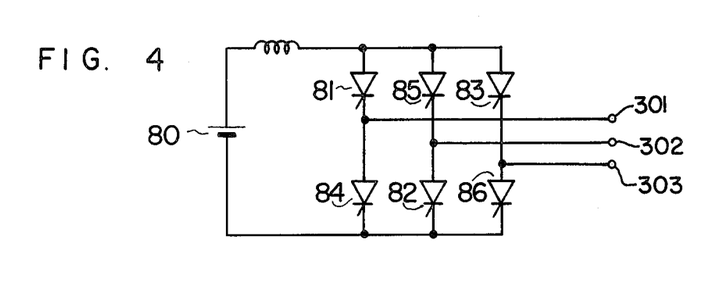
FIG. 4 is a circuit diagram of a three-phase inverter circuit.

The present invention will next be described in connection with another embodiment. FIG. 4 shows an inverter circuit for generating a three-phase AC output in which the reference numerals 301, 302, and 303 denote the three-phase A.C. source terminals. Thyristor valves 81 and 86 are coupled to a direct current source in a bridge connection as the respective arms there of. Each of these thyristor valves 81 to 86 is constituted by a series circuit of a plurality of thyristors. In the thus arranged inverter, the period during which each thyristor valve conducts is 120° as measured by the electrical angle of the alternating current output.

Figure 5:
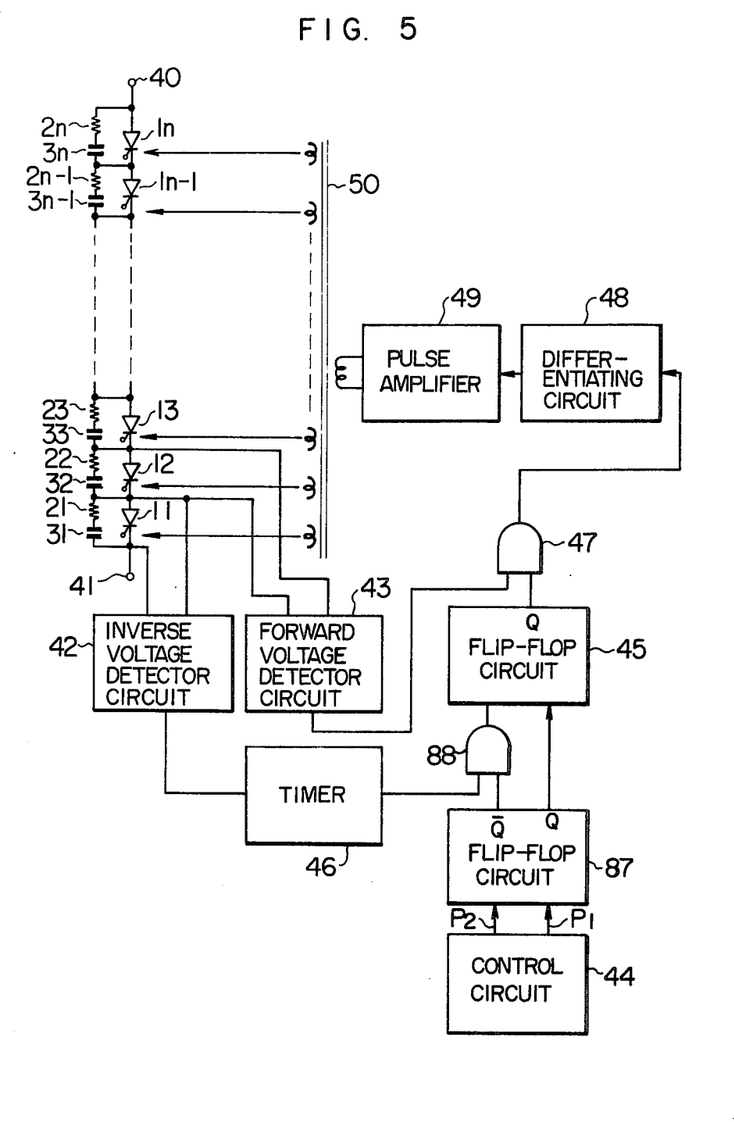
FIG. 5 is a circuit diagram of another embodiment of the gate controlling apparatus for a thyristor valve according to the present invention.
Figure 6:
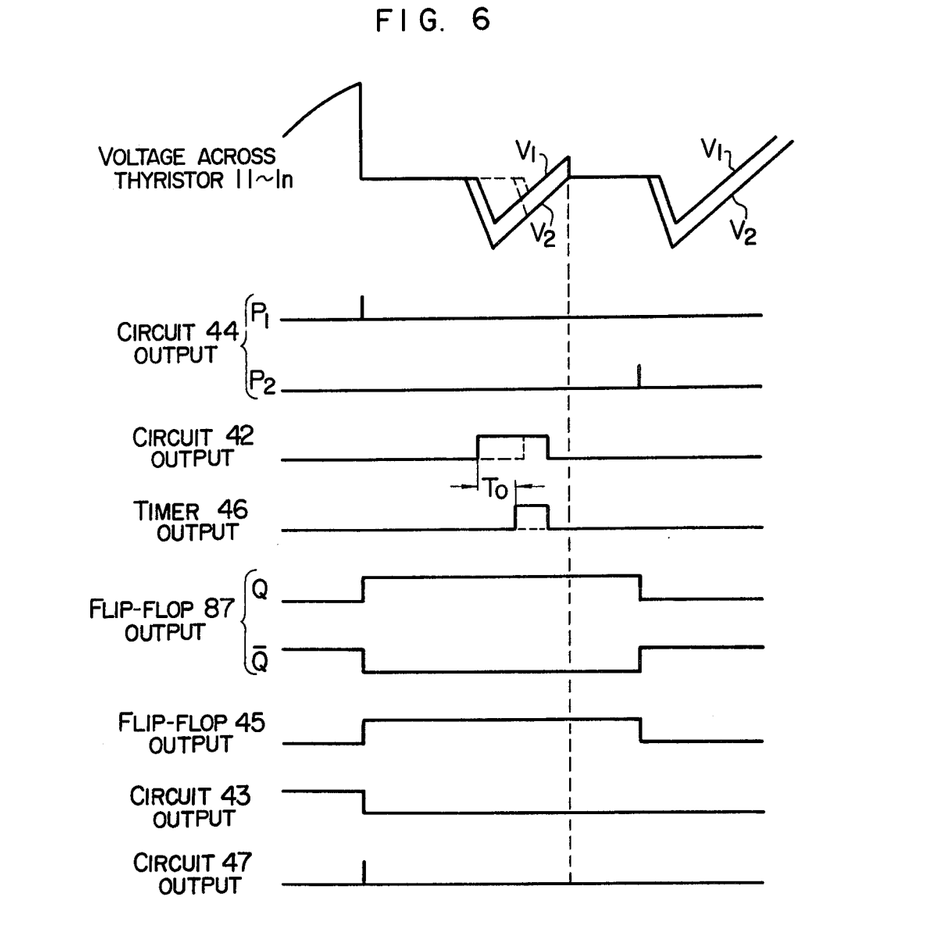
FIG. 6 is operational waveforms generated from the circuit shown in FIG. 6.

FIG. 5 shows another embodiment of the present invention in which the invention is applied to a circuit as shown in FIG. 4. The apparatus of FIG. 5 differs from that of FIG. 1 in that in the apparatus of FIG. 5 a second flip-flop 87 is connected at a stage next to the control circuit 44 to provide a resetting signal to the flip-flop 45 through an AND circuit 81 when the AND condition of the output from the second flip-flop 87 and the output from the timer 46 satisfied. The description is of the circuits designated with the same reference numerals as those in FIG. 1 is omitted because of their similar operations. The operation of the apparatus shown in FIG. 5 will be described with reference to FIG. 6. The second flip-flop 87 is set in response to a firing pulse $P_1$ at one arm and reset in response to a 120° retarded pulse $P_2$. The flip-flop 45 is also set in response to the firing pulse $P_1$. If the current is intermittent within the period of time (120°) during which the thyristor arm is to be conductive, the timer 46 generates an output when the period of inverse voltage exceeds a predetermined value To. The second AND circuit 88 is, however, actuated because the output $\overline{Q}$ from the second flip-flop 87 is "0" during the conductive period so that the flip-flop 45 is not reset. The transition from the inverse voltage to a forward voltage causes the output from the forward voltage detector 43 to vary to "1." At this time, a firing pulse is generated to fire the thyristors 11 to 1n. In other words, even if the current is intermittent during the conductive period and an inverse voltage is applied across the arms, a firing pulse is generated to fire the thyristors irrespective of the length of the period of inverse voltage, that is, irrespective of the fact that the voltage across the thyristor takes the solid line or dotted line shown in FIG. 6. The description is omitted about the operation at the time of the insufficient period of inverse voltage because it is the same as the embodiment shown in FIG. 1.

Figure 7:
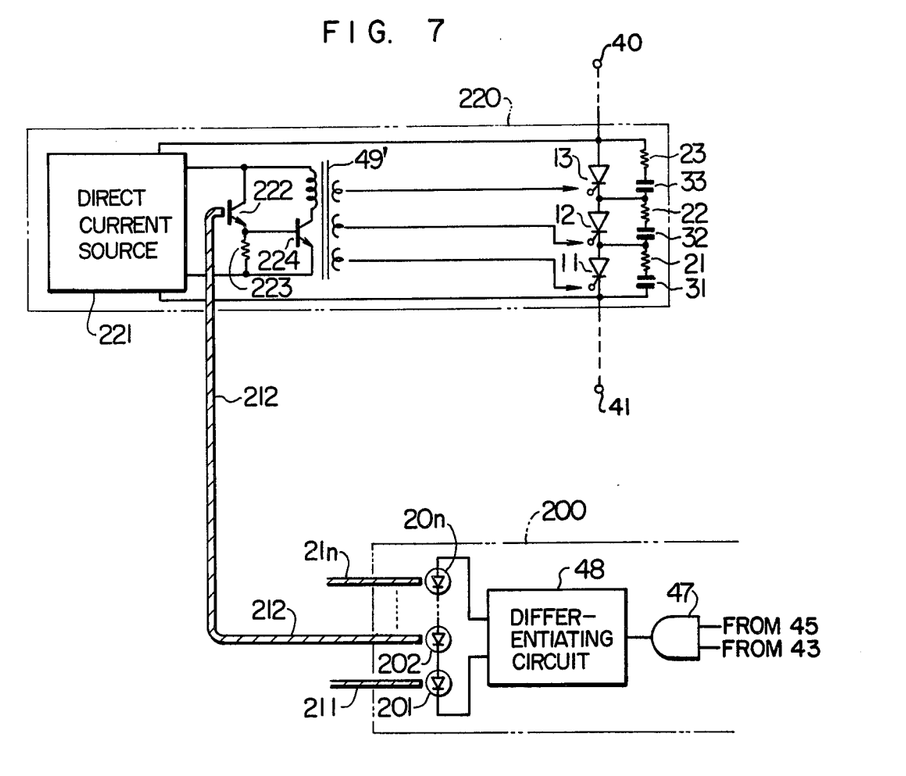
FIG. 7 is a circuit diagram of still another embodiment of the gate controlling apparatus according to the invention.
Figure 8:
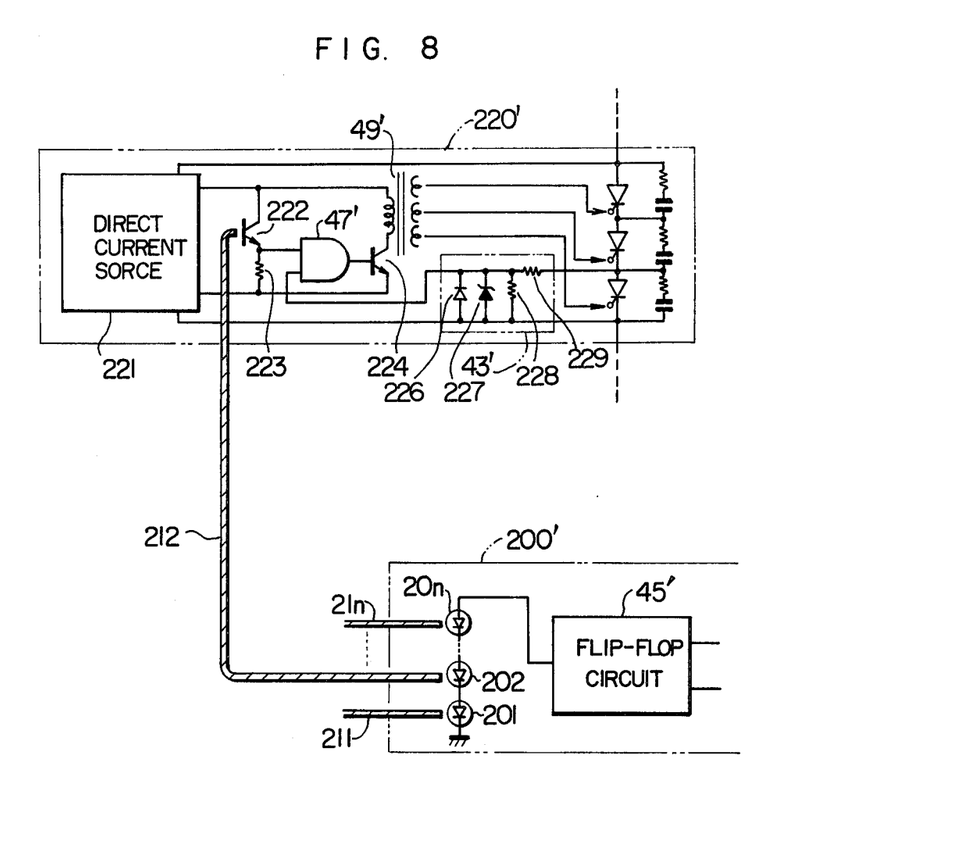
FIG. 8 is a circuit diagram of a further embodiment of the gate controlling apparatus according to the present invention.
Figure 9:
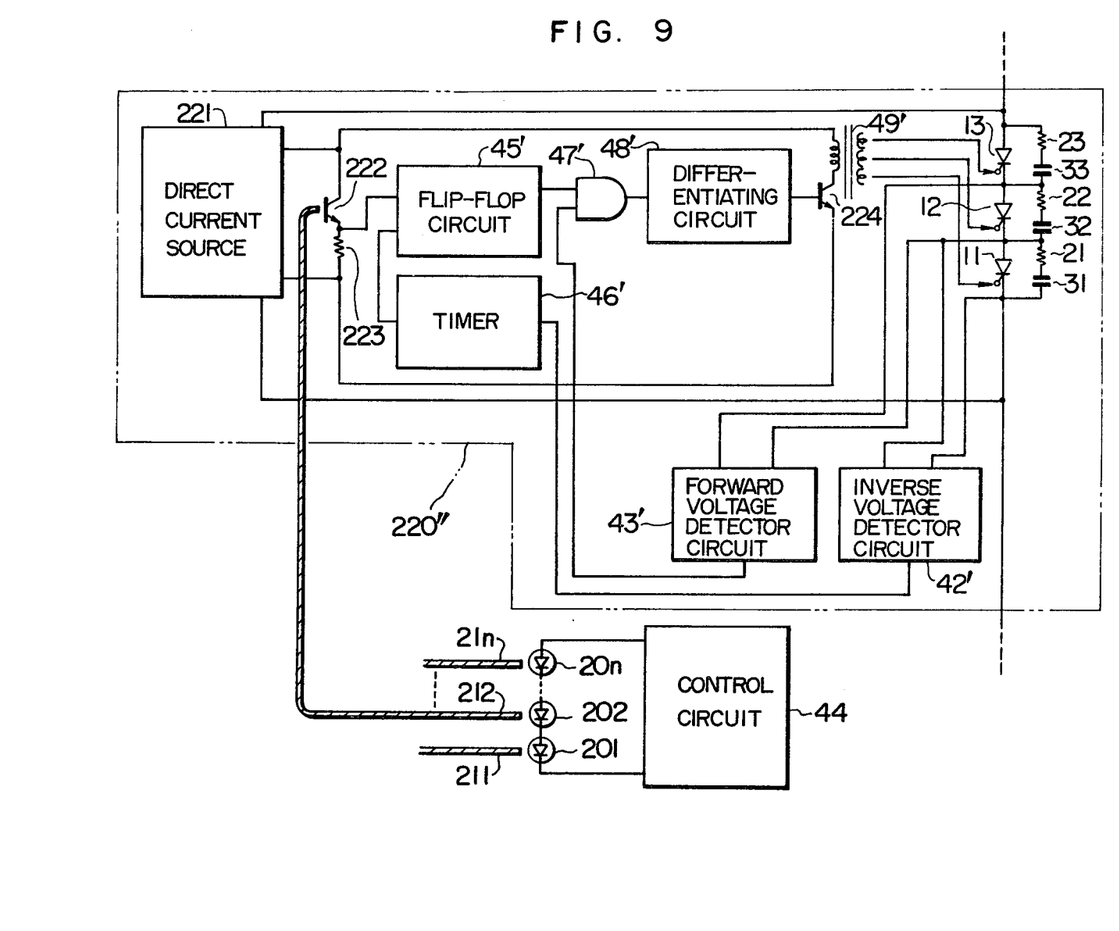
FIG. 9 is a circuit diagram of a still further embodiment of the gate controlling apparatus according to the invention.

FIGS. 7 to 9 are examples adapted for practical use with reference to the embodiments shown in FIGS. 1 and 5.

In FIG. 7 there are shown a gate controlling circuit 200, light-emitting elements 201 to 20n, and light guides 211 to 21n for transmitting light. A tray 220 is arranged as a unit composed of one or more series-connected thyristors and includes therein a direct current source 221, a photosensitive element 222, a resistor 223, a transistor 224 and a pulse transformer 49'. Three series connections consisting of a capacitor and a resistor, 31 and 21, 32 and 22 and 33 and 23, are respectively connected to thyristors 11 to 13 for the purpose of dividing the voltage applied to the thyristors. In FIG. 7, the output from the differentiating circuit 48 causes a current to flow through the light-emitting elements 201 to 20n to emit light which is then transmitted to the respective trays through the light guides 211 to 21n. The light emitted by the light-emitting element 202 is led to the tray 220 through the guide 212 to actuate the photosensitive element 222, the output from which is amplified by the transistor 224 to generate an output at the secondary windings of the pulse transformer 49'. The output of the transformer 49' is transmitted to the thyristors 11 to 13 to fire them.

In summary all the circuits required to generate the firing pulse are arranged as a unit 200, while the pulse amplification circuit is provided in each tray 220.

The gate pulses must be transmitted to all the thyristors by means which can insulate the valve per se from the pulse generating circuit. In this embodiment, since the power source for gating pulses is arranged in each tray the embodiment is advantageous in that means such as light guides which cannot provide the direct transmission of a pulse with large power may be used.

FIG. 8 shows another embodiment, in which each tray 220' is provided with a forward voltage detector circuit 43', a pulse amplifier 225 and an AND circuit 47' receiving as an input the output of the forward voltage detector 43' and as another input the output of the flip-flop 45'. In FIG. 8, the forward voltage detector 43' is composed of a diode 226, a Zener diode 227 for cutting a voltage exceeding a predetermined value, and resistors 228, 229. A forward voltage over the predetermined value is cut by the Zener diode 227. The AND circuit 47' receives only a forward voltage at its one input terminal because an inverse voltage is short-circuited by the diode 226.

The flip-flop 45' and the light-emitting diodes for converting its output to light are arranged in a unit 200'.

It is general that if the forward voltage detector is connected to a specific thyristor having a small storage charge which is selected among all the thyristors constituting the thyristor valve, the scattering of the difference between the storage charge of this specified thyristor and that of the remaining thyristors is made large. According to the embodiment of the present invention, however, the difference in the storage charge may be left small because the thyristor having a small storage charge is selected among the thyristors in each tray and the forward voltage detector 43' is connected to the thus selected thyristor in each tray. Therefore, a lower forward voltage is applied to each of the other thyristors when the forward voltage is detected from the selected thyristor to fire the thyristor valve by the gate pulse. Further, a relatively simple isolation may be provided because the forward voltage to be detected is equal to the potential at the tray 220'.

FIG. 9 shows another embodiment, in which the control circuit 44 is arranged in a unit, and the circuits required for transmission of the pulse from the control circuit 44 to the thyristors 11 to 13 are provided in each tray 220''.

In such an arrangement that one forward voltage detector circuit and one inverse voltage detector circuit are provided for each valve, the isolation is not easy depending upon the structure of the valve in transmitting the output to other circuits, but an easy isolation may be provided in the present embodiment because such forward and inverse voltage detector circuits 43' and 42' are provided in each tray 220".

As mentioned above, the apparatus according to the present invention includes a judging circuit for judging whether the gate signal should be applied to the thyristor valve or not, a forward voltage detector circuit for detecting the forward voltage across at least one of the thyristors of the thyristor valve, and an AND circuit for generating an output only at a time when the AND condition between the respective outputs of the judging circuit and forward voltage detector circuit is satisfied, so that a narrow gate signal may be applied to each of the thyristors of the thyristor valve in response to the output from the AND circuit. Thus, it is possible, according to the present invention, to provide such a gate controlling apparatus for a thyristor valve that generates a narrow gate signal so that the thyristor valve may be controlled excellently even if each thyristor of the thyristor valve has an irregularity in its characteristics.

The various embodiments described herein by way of example relate to a series connected thyristor valve; however, as will be apparent from the principles of the invention derived from this specification, the invention is equally applicable to a parallel connected thyristor valve arrangement.

What is claimed is:

1. A gate controlling apparatus for a thyristor valve composed of a plurality of series connected thyristors having different storage characteristics, comprising first means for judging whether a gate signal is to be applied to each of the thyristors in said thyristor valve, second means connected across a single selected one of said thyristors which has the smallest storage charge under equal temperature conditions among said thyristors in said thyristor valve for detecting a forward voltage thereacross, AND means for generating an output at a time when an AND condition between the respective outputs of said first and said second means is satisfied, and pulse amplifier means for providing a narrow gate signal to each of said thyristors of said thyristor valve in response to the output of said AND means.

2. A gate controlling apparatus for a thyristor valve according to claim 1, wherein said thyristor valve is disposed in a housing having a temperature gradient therein and said one thyristor is disposed in the thyristor valve housing at a position having a relatively low temperature with respect to the positions of the other thyristors therein.

3. A gate controlling apparatus for a thyristor valve including a plurality of series connected thyristors to which a narrow gate signal is applied in response to an instruction from a control circuit, said apparatus comprising first means for storing the reception of the instruction from said control circuit, second means for detecting an inverse voltage across at least one of said thyristors in said thyristor valve, third means for resetting said first means upon the detection of the fact that the output of said second means continues over a predetermined time, fourth means for detecting a forward voltage across at least one of said thyristors in the thyristor valve, AND means for generating an output at a time when an AND condition between the respective outputs of said first and said fourth means is satisfied, and pulse amplifier means for providing the narrow gate signal to each of said thyristors of said thyristor valve in response to the output from the AND circuit.

4. A gate controlling apparatus for a thyristor valve according to claim 3, wherein said second means detects a voltage across a selected one of said thyristors having the largest storage charge under equal temperature conditions among said thyristors and said fourth means detects a voltage across a selected one of said thyristors having the smallest storage charge under equal temperature conditions among said thyristors.

5. A gate controlling apparatus for a thyristor valve according to claim 4, wherein said thyristor valve is disposed in a housing having a cooling medium flowing therethrough and one of said thyristors having the largest storage charge is disposed in said thyristor valve housing at a position showing a relatively high temperature, and said one of said thyristors having the smallest storage charge is disposed in said thyristor valve housing at a position showing a relatively low temperature.

6. A gate controlling apparatus for a thyristor valve according to claim 3, wherein said second means detects a voltage across one of said thyristors having the largest storage charge under equal temperature conditions among said thyristors and said fourth means detects a voltage across one of said thyristors having the smallest storage charge under equal temperature conditions among said thyristors.

7. A gate controlling apparatus for a thyristor valve according to claim 3, wherein said thyristors constituting said thyristor valve are divided into groups and said second means is provided in each of said groups.

8. A gate controlling apparatus for a thyristor valve according to claim 3, wherein said thyristors constituting said thyristor valve are divided into groups and said second and fourth means are provided in each of said groups.

9. A gate controlling apparatus for a thyristor valve including a plurality of series connected thyristors to which a narrow gate signal is applied in response to an instruction from a control circuit, said apparatus comprising a first memory circuit for storing the reception of the instruction from the control circuit, an inverse voltage detector circuit for detecting an inverse voltage across at least one of said thyristors in said thyristor valve, a timer circuit for detecting the fact that the output from said inverse voltage detector circuit continues over a predetermined time to produce an output, a forward voltage detector circuit for detecting a forward voltage across at least one of said thyristors in said thyristor valve, an AND circuit for providing an output at a time when an AND condition between the respective outputs of said first memory circuit and said forward voltage detector circuit is satisfied, an inhibit circuit for preventing the output of said timer circuit from being transmitted to said first memory circuit to reset it within a period of time during which said thyristor valve is to be conducted, and a pulse amplifier for providing the narrow gate signal to each of said thyristors of said thyristor valve in response to the output from said AND circuit.

10. A gate controlling apparatus for a thyristor valve according to claim 9, wherein said inhibit circuit comprises a second memory circuit for storing a signal from said control circuit generated at a time when the conduction of said thyristor valve is to come to an end, and a second AND circuit for transmitting the output from said timer circuit to said first memory circuit at a time when the AND condition between the respective outputs of said second memory circuit and said timer circuit is satisfied.

11. A gate controlling apparatus for a thyristor valve according to claim 9, wherein said forward voltage detector circuit detects a voltage across one of said thyristors having a the smallest storage charge under equal temperature conditions among said thyristors and said inverse voltage detector circuit detects a voltage across one of said thyristors having the largest storage charge under equal temperature conditions among said thyristors.

12. A gate controlling apparatus for a thyristor valve according to claim 11, wherein said thyristor valve is disposed in a housing having a cooling medium flowing therethrough and said one of said thyristors having the smallest storage charge is disposed in the thyristor valve housing at a position showing a relatively low temperature and said one of said thyristors having the largest storage charge is disposed in the thyristor valve housing at a position showing a relatively high temperature.

* * * * *